(12) United States Patent
Zeira et al.

(10) Patent No.: US 7,710,928 B2
(45) Date of Patent: *May 4, 2010

(54) CHANNELIZATION CODE DETERMINATION BY A USER EQUIPMENT

(75) Inventors: Ariela Zeira, Huntington, NY (US);
Eldad Zeira, Huntington, NY (US);
Alexander Reznik, Titusville, NJ (US);
Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1016 days.

This patent is subject to a terminal disclaimer.

(21) Appl. No.: 11/098,276

(22) Filed: Apr. 4, 2005

(65) Prior Publication Data
US 2005/0169216 A1    Aug. 4, 2005

Related U.S. Application Data

(63) Continuation of application No. 10/090,498, filed on Mar. 4, 2002, now Pat. No. 6,885,649, which is a continuation of application No. 09/775,969, filed on Feb. 2, 2001, now Pat. No. 6,934,271.

(60) Provisional application No. 60/180,402, filed on Feb. 4, 2000.

(51) Int. Cl.
*H04B 7/216* (2006.01)
(52) U.S. Cl. ..................................... 370/335
(58) Field of Classification Search ................ 370/310, 370/314, 319, 320, 321, 280, 335, 338, 345, 370/441, 342, 431, 445, 464, 479; 375/200
See application file for complete search history.

(56) References Cited

U.S. PATENT DOCUMENTS

| 5,291,475 A | 3/1994 | Bruckert |
| 6,078,607 A | 6/2000 | Monroe et al. |

(Continued)

FOREIGN PATENT DOCUMENTS

DE    19907502    * 8/2000

(Continued)

OTHER PUBLICATIONS

3GPP TS 25.221 v3.1.0 (Dec. 1999), $3^{rd}$ Generation Partnership Project; Technical Specification Group Radio Access Network; Physical channels and mapping transport channels onto physical channels (TDD) (3G TS 25.221 version 3.1.0) pp. 1-47.

(Continued)

*Primary Examiner*—Kwang B Yao
*Assistant Examiner*—Anh Ngoc Nguyen
(74) *Attorney, Agent, or Firm*—Volpe and Koenig, P.C.

(57) ABSTRACT

A time division duplex/code division multiple access user equipment receives a plurality of communication bursts transmitted in a time slot. A midamble code included in a received communication burst is determined. A channelization code of a determined midamble's communication burst is determined. A mapping between channelization codes and midamble codes exists such that each midamble being mapped to at least one channelization code and at least one midamble code being mapped to at least two channelization codes which may be received in communication bursts simultaneously.

6 Claims, 5 Drawing Sheets

U.S. PATENT DOCUMENTS

| | | | | |
|---|---|---|---|---|
| 6,275,506 | B1* | 8/2001 | Fazel et al. | 370/478 |
| 6,339,612 | B1* | 1/2002 | Stewart et al. | 375/140 |
| 6,567,374 | B1* | 5/2003 | Bohnke et al. | 370/203 |
| 6,567,461 | B1 | 5/2003 | Moon et al. | |
| 6,606,314 | B1* | 8/2003 | Bahrenburg et al. | 370/347 |
| 6,611,513 | B1 | 8/2003 | ten Brink | |
| 6,795,417 | B2* | 9/2004 | Zeira et al. | 370/335 |
| 2005/0169198 | A1* | 8/2005 | Zeira et al. | 370/280 |
| 2005/0232195 | A1* | 10/2005 | Jones | 370/329 |

FOREIGN PATENT DOCUMENTS

| | | |
|---|---|---|
| GB | 2 351 422 A | 12/2000 |
| GB | 2351422 | 12/2000 |
| GB | 2351422 A | 12/2000 |
| WO | 99/40698 | 8/1999 |
| WO | WO 99/40698 | 8/1999 |
| WO | 99/52249 | 10/1999 |
| WO | WO 99/52249 | 10/1999 |
| WO | 00/27052 | 5/2000 |
| WO | 00/51300 | 8/2000 |
| WO | 00/54443 | 9/2000 |
| WO | 00/57654 | 9/2000 |

OTHER PUBLICATIONS

3GPP TS 25.221 v3.5.0—Draft (Dec. 2002), $3^{rd}$ Generation Partnership Project; Technical Specification Group Radio Access Network; Physical Channels and mapping of transport channels onto physical channels (TDD) (Release 1999) pp. 1-52.

Jung et al., "Joint Detection with Coherent Receiver Antenna Diversity in CDMA Mobile Radio System," IEEE Transactions on Vehicular Technology, vol. 44, No. 1, pp. 75-88 (Feb. 1995).

Papathanassiou et al., Multi-User Direction of Arrive and Channel Estimation for Time-Slotted CDMA with Joint Detection, IEEE DSP97, pp. 375-378, (1997).

Third Generation Partnership Project, Technical Specification Group Radio Access Network; UTRAN lub Interface NBAP Signalling (Release 1999), 3GPP TS 25.433 V3.0.0 (Jan. 2000).

Third Generation Partnership Project, Technical Specification Group Radio Access Network; UTRAN lub Interface NBAP Signalling (Release 1999), 3GPP TS 25.433 V3.4.0 (Dec. 2000).

Third Generation Partnership Project, "Technical Specification Group Radio Access Network; Services provided by the physical layer (Release 1999)," 3GPP TS 25.302 V3.4.0 (Mar. 2000).

Third Generation Partnership Project, "Technical Specification Group Radio Access Network; Services provided by the physical layer (Release 1999)," 3GPP TS 25.302 V3.7.0 (Dec. 2000).

Third Generation Partnership Project, "Technical Specification Group Radio Access Network; Physical channels and mapping of transport channels onto physical channels (TDD) (Release 1999)," 3GPP TS 25.221 V3.1.0 (Dec. 1999).

Third Generation Partnership Project, "Technical Specification Group Radio Access Network; Spreading and modulation (TDD) (Release 1999)," 3GPP TS 25.223 V3.1.0 (Dec. 1999).

Third Generation Partnership Project, "Technical Specification Group Radio Access Network; Spreading and modulation (TDD) (Release 1999)," 3GPP TS 25.223 V3.4.0 (Sep. 2000).

$3^{rd}$ Generation Partnership Project, "Technical Specification Group Radio Access Network; Physical Channels and Mapping of Transport Channels onto Physical Channels (TDD)"; 3G TS 25.221 V3.1.0; Dec. 1999.

* cited by examiner

CHANNELIZATION CODE DETERMINATION BY A USER EQUIPMENT

CROSS-REFERENCE TO RELATED APPLICATIONS

This application is a continuation of U.S. patent application Ser. No. 10/090,498, filed Mar. 4, 2002 which is a continuation of U.S. patent application Ser. No. 09/775,969, filed Feb. 2, 2001, which claims priority from U.S. Provisional Patent Application No. 60/180,402, filed Feb. 4, 2000, all of which are incorporated by reference as if fully set forth.

BACKGROUND OF THE INVENTION

The present invention relates generally to wireless time division duplex using code division multiple access (TDD/CDMA) communication systems. In particular, the invention relates to determining channelization codes for use in multiuser detection in the downlink for TDD/CDMA systems.

A TDD/CDMA communication system is illustrated in FIG. 1. The system 10 has multiple base stations $12_1$ to $12_5$. Each base station $12_1$ has an associated operating area. User equipments (UEs) $14_1$ to $14_3$ in a base station's operating area communicate with that base station $12_1$. Communications transmitted from a base station $12_1$ to a UE $14_1$ are referred to as downlink communications and communications transmitted from a UE $14_1$ to a base station $12_1$ are referred to as uplink communications.

In a wireless TDD/CDMA communication system, multiple communications are sent in a shared frequency spectrum. One such system is proposed in a third generation wideband-CDMA (W-CDMA) standard. In CDMA systems, multiple communications are sent in the shared spectrum and are distinguished by channelization codes. In TDD/CDMA systems, the shared spectrum is also time divided using repeating frames having a fixed number of time slots, such as fifteen (15) time slots. Each time slot is used to transmit either only uplink or downlink communications. As a result, the communications are distinguished by both channelization codes and time slots. A single channelization code used in a single time slot is referred to as a resource unit. Based on a communications bandwidth, the communication may require one or multiple resource units. Typical data modulation schemes used in TDD/CDMA systems are quadrature phase shift keying (QPSK), binary phase shift keying (BPSK) and N Quadrature Amplitude Modulation (QAM), such as N=8, 16 or 64.

Data is transmitted in such systems using communication bursts 16. A communication burst 16 carries data in a single time slot using a single channelization code (a single resource unit). A typical communication burst 16 has a midamble 20, a guard period 18 and two data bursts 22, 24, as shown in FIG. 2. The midamble 20 separates the two data bursts 22, 24. The guard period 18 separates the communication bursts 16 to allow for the difference in arrival times of bursts 16 transmitted from different transmitters. The two data bursts 22, 24 contain the communication burst's data. The midamble 20 contains a midamble code for use in estimating the channel response between the receiver and transmitter.

Since multiple communication bursts may be transmitted in a single time slot, a receiver must be able to distinguish data from the multiple bursts. One approach to recover the received data is multiuser detection (MUD).

In MUD, a receiver recovers all communication bursts' data in a time slot, including bursts transmitted to other UEs. To recover all the bursts' data, the MUD receiver needs to know all of the channelization codes used to transmit the bursts. In the proposed TDD mode of W-CDMA, each UE $14_1$ to $14_3$ only knows which channelization and midamble codes are used for carrying information intended for it. To determine all the channelization and midamble codes, a bank of matched filters is used to detect all possible channelization/midamble combinations. The output power from each matched filter is compared to a threshold to determine whether a particular channelization/midamble combination was used. Due to the number of required matched filters, this approach has a high complexity. Additionally, if there is a high correlation between channelization codes, this approach may have poor performance. Accordingly, it is desirable to have alternate approaches for UEs $14_1$ to $14_3$ to be able to determine the active channelization codes.

SUMMARY OF THE INVENTION

A time division duplex/code division multiple access user equipment receives a plurality of communication bursts transmitted in a time slot. A midamble code included in a received communication burst is determined. A channelization code of a determined midamble's communication burst is determined. A mapping between channelization codes and midamble codes exists such that each midamble being mapped to at least one channelization code and at least one midamble code being mapped to at least two channelization codes which may be received in communication bursts simultaneously.

DETAILED DESCRIPTION OF THE PREFERRED EMBODIMENT(S)

Figure 1:
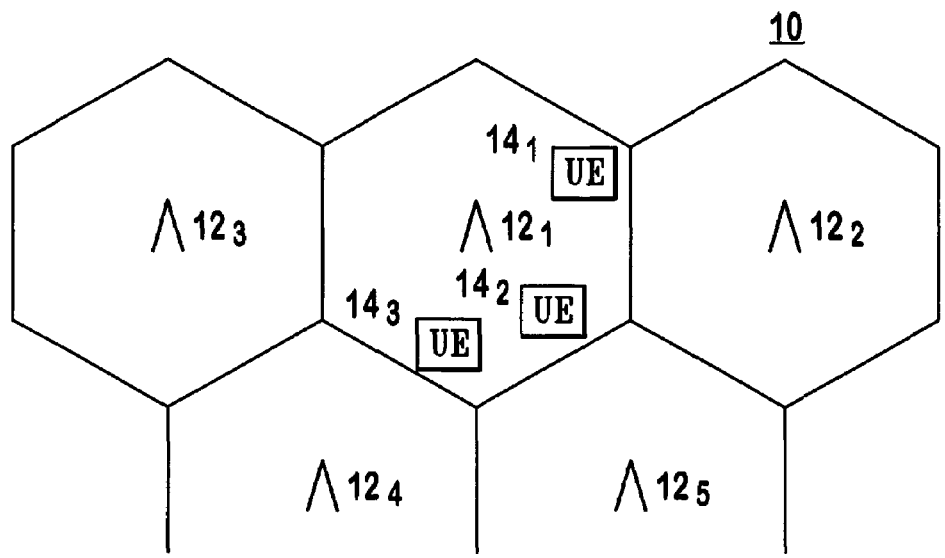
FIG. 1 is an illustration of a time division duplex/code division multiple access communication system.
Figure 2:
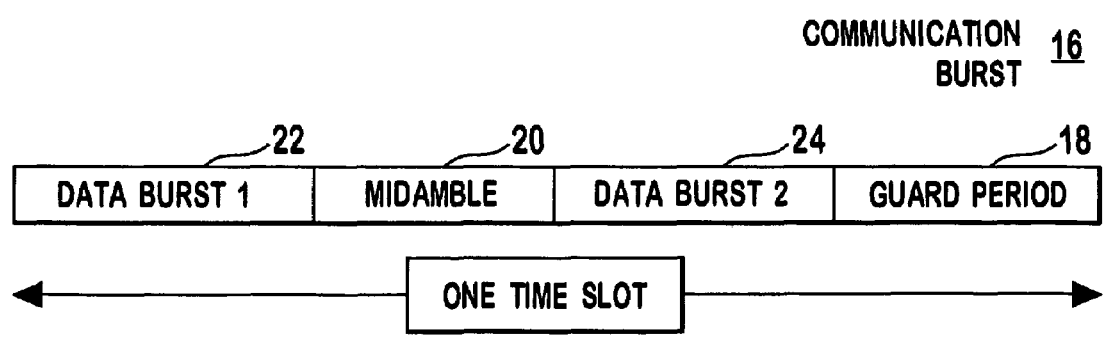
FIG. 2 is an illustration of a communication burst.
Figure 3:
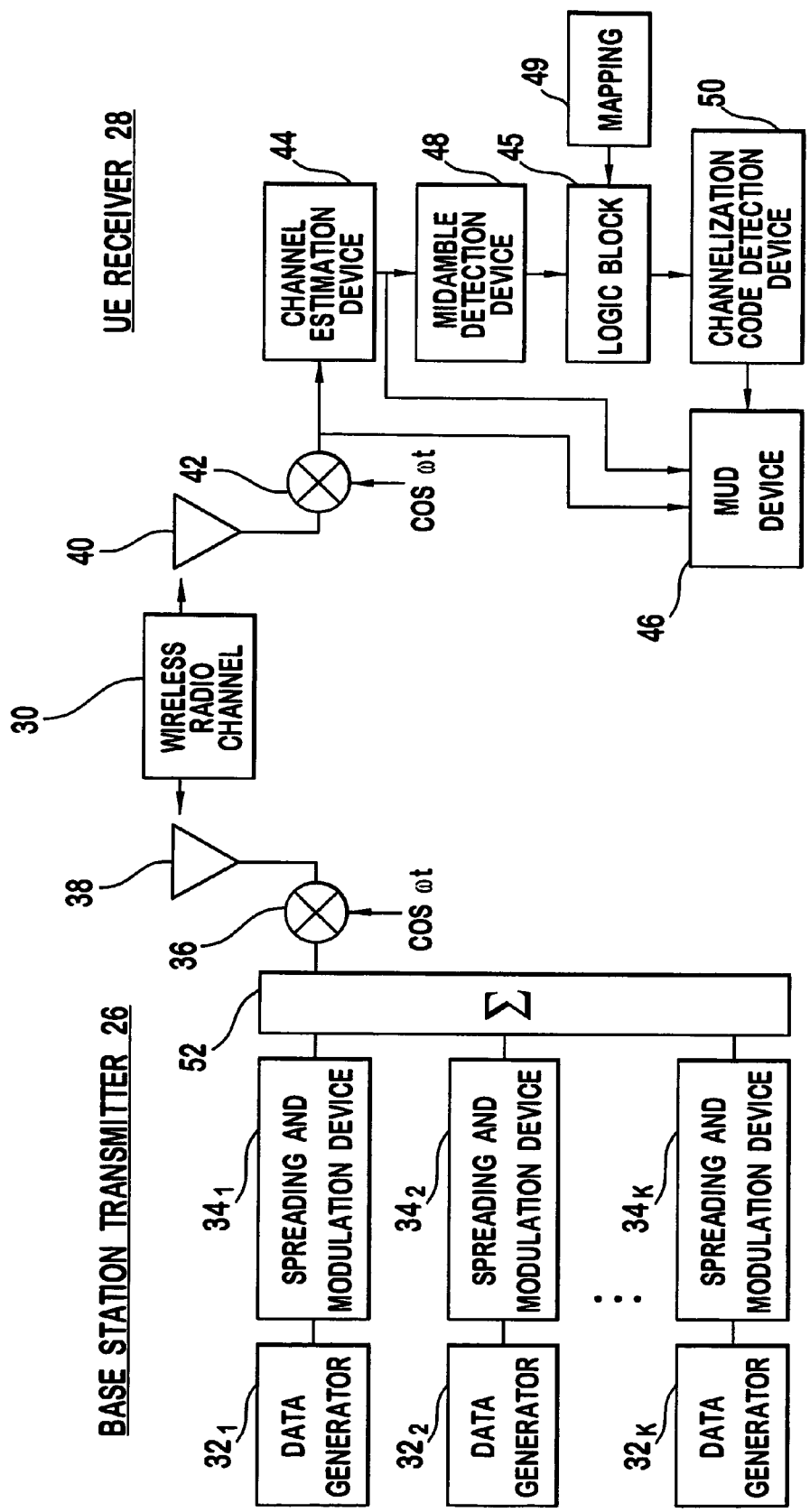
FIG. 3 is an illustration of a simplified base station transmitter and a user equipment receiver.

FIG. 3 illustrates a simplified base station transmitter 26 and a UE receiver 28 using multiuser detection (MUD). Data to be communicated to the active UEs $14_1$ to $14_3$ is produced by data generators $32_1$ to $32_K$. Each generator $32_1$ to $32_K$ produces data to be sent in a particular communication burst. Each communication burst's generated data is subsequently formatted into a communication burst by a spreading and modulation device $34_1$ to $34_K$. The spreading and modulation device $34_1$ to $34_K$ adds the midamble and spreads the generated data with a channelization code associated with that communication burst. Additionally, the spread data is time multiplexed into the appropriate time slot. All of the communication bursts are combined by a combiner 52. The combined communication bursts are modulated up to radio frequency, such as by a mixer 36, and the radio frequency signal is radiated by an antenna 38 through a wireless radio channel 30. If transmit diversity is utilized by the base station $14_1$, the radio frequency signal will be transmitted by multiple antennas.

At a UE receiver 28, radio frequency signals are received by an antenna 40. The received signals are demodulated to a baseband signal, such as by a mixer 42. A channel estimation device 44 is used to estimate the channel that the communication bursts were transmitted in using the transmitted midamble codes. A multiuser detection (MUD) device 46 processes the baseband signal using the estimated channel information and the active channelization codes to produce hard symbols.

Figure 4:
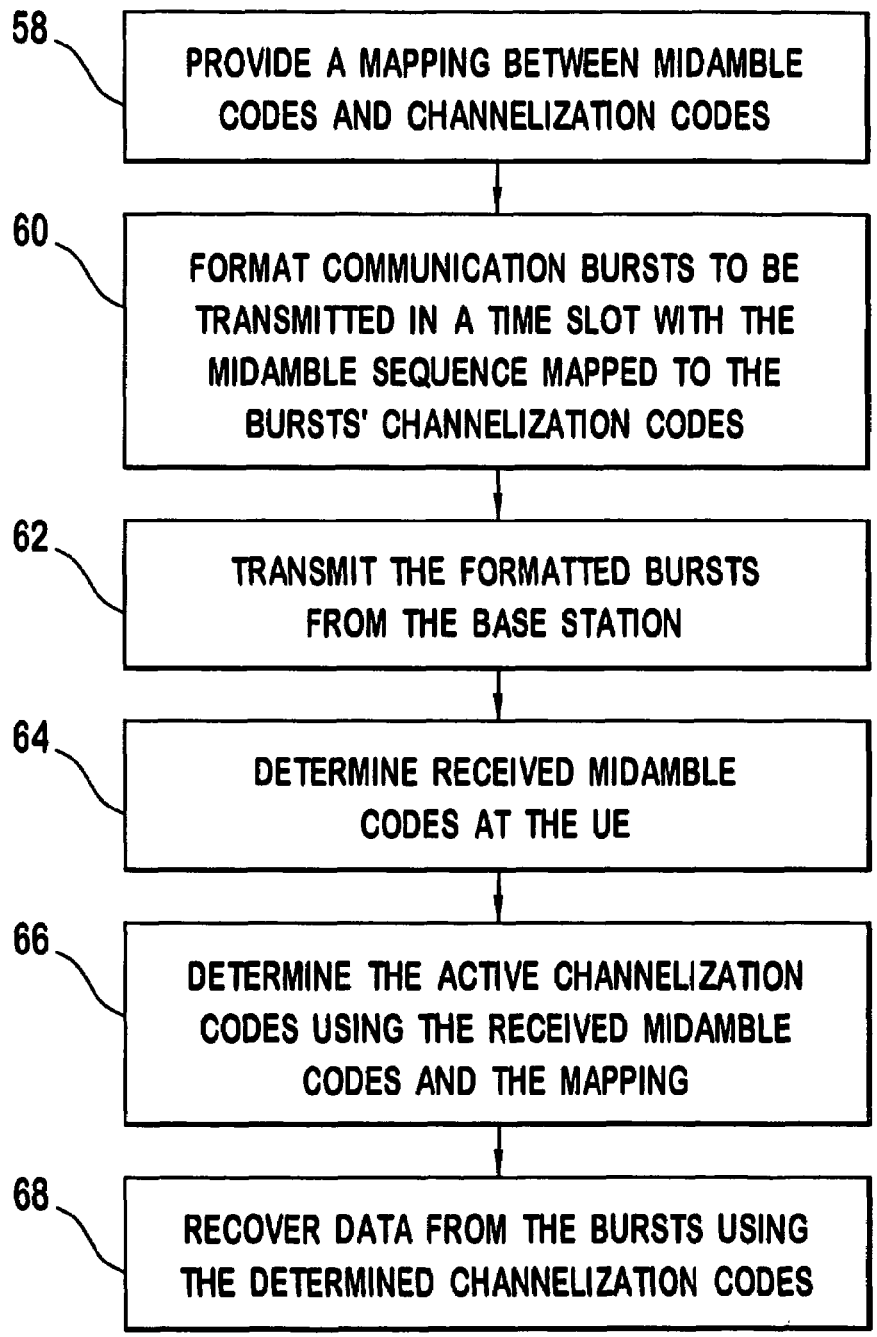
FIG. 4 is a flow chart of downlink channelization code identification.
Figure 5:
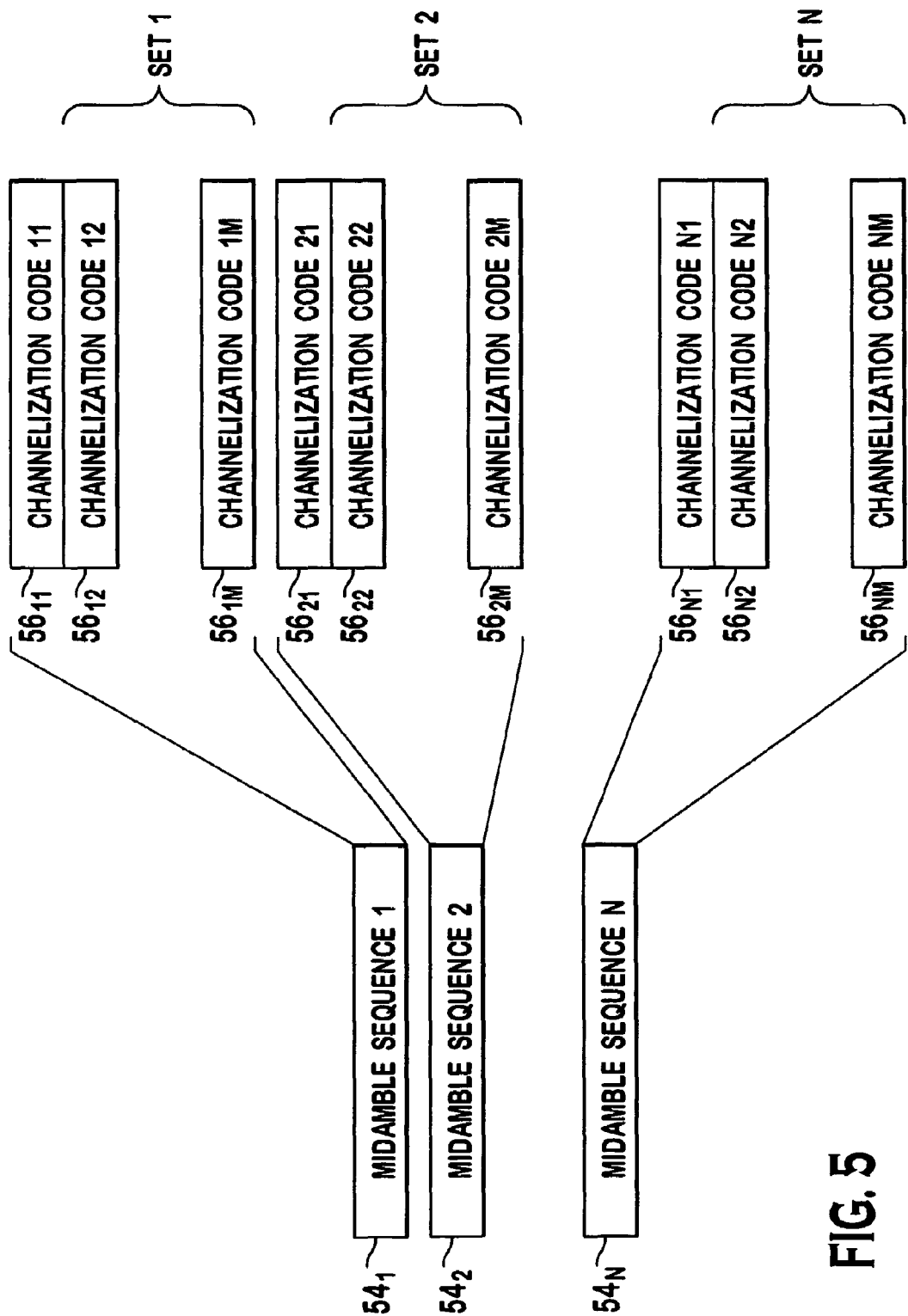
FIG. 5 is an illustration of midamble sequence to channelization code mapping.

Identifying active channelization codes is shown in the flow chart of FIG. 4. One approach to aid in identifying active channelization codes at the UE 14$_1$ is to provide a mapping between midamble codes (midamble sequences) 54$_1$ to 54$_N$ and channelization codes 56$_{11}$ to 56$_{NM}$, 58. Each midamble sequence 54$_1$ to 54$_N$ is associated with a set of channelization codes 56$_{11}$ to 56$_{NM}$, as illustrated in FIG. 5. The sets may contain only a single channelization code, which is a one to one mapping of midambles to channelization codes. A burst transmitted by the base station 12$_1$ with a channelization code of a midamble's set is formatted with that midamble sequence, 60, 62. To illustrate, if a burst with channelization code 21 was sent, midamble sequence 2 is used for that burst.

At the UE receiver 28, after channel estimation, the transmitted midamble sequences are detected by a midamble sequence detection device 48, 64. Based on the detected midambles, a logic block 45, utilizing the midamble to channelization code mapping 49, determines the set of possible channelization codes. A channelization code detection device 50 determines the received channelization codes based on the determination, 66. If a one midamble code to one channelization code mapping is used, the logic block 45 determines the channelization codes. As a result, for a one to one mapping, the channelization code detection device 50 is not used. The MUD device 46 uses the determined channelization codes and the channel response for the midamble sequences associated with the channelization codes to detect the data from all the bursts, 68.

Figure 6:
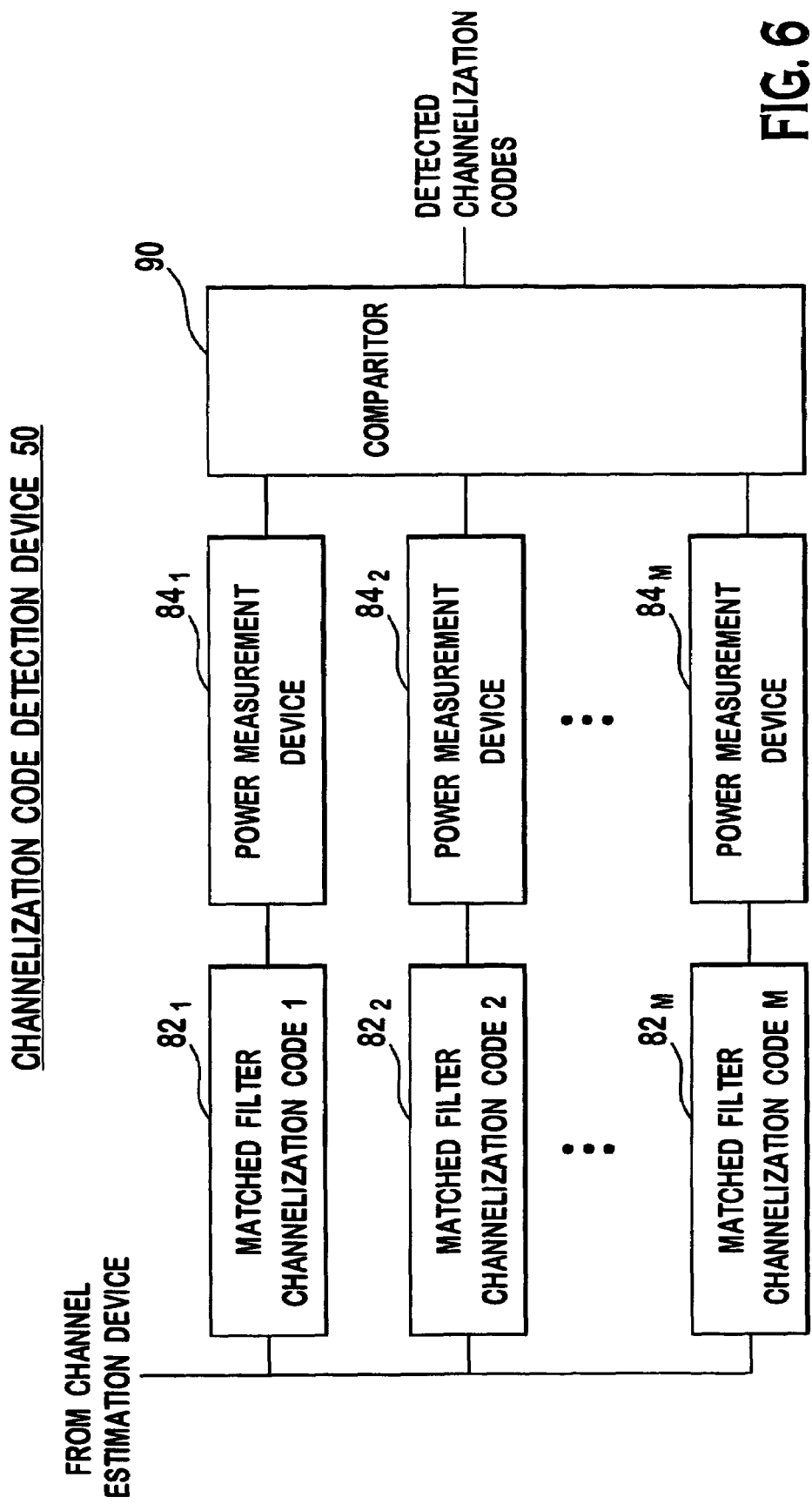
FIG. 6 is a channelization code detection device.

One channelization code detection device 50 is shown in FIG. 6. Matched filters 82$_1$ to 82$_M$ are matched to the possible channelization codes and associated channel responses as determined by the logic block 45. Since only the possible channelization codes need to be checked, the number of matched filters 82$_1$ to 82$_M$ is greatly reduced, reducing the complexity and improving the performance of the receiver 28. The power of the soft symbols produced by each matched filter 82$_1$ to 82$_M$ is measured by corresponding power measurement devices 84$_1$ to 84$_M$. The comparator 80 determines the received channelization codes based on the power measurement for each channel. If the number of transmitted channelization codes is known, the comparator 80 selects that number of channels with the highest measured power. Otherwise, the comparator 80 compares each channel's power level to a threshold to determine the transmitted channelization codes.

To aid in identifying channelization codes, channelization code information, such as transmitted channelization codes or a number of transmitted channelization codes, may be signaled to the UE 14$_1$. The signaled information can be used in conjunction with channelization/midamble code mapping or when mapping is not used. The additional channelization code information will increase the accuracy in determining the active channelization codes at the UE receiver 28. One such signal would be a layer one signal, where the midamble code or midamble code shift is associated with the information. The midamble detection device 48 determines the received midamble code(s) and the logic block 45 recovers the channelization code information using the determined midamble codes. Using the recovered information, the channelization code detection device 50 uses the recovered information to aid in the channelization code determination. Another approach signals channelization code information using a layer 2/3 signal. The signal is generated by the network circuitry. The layer 2/3 signal can be used in conjunction with layer one signals or with the midamble/channelization code mapping.

What is claimed is:

1. A time division duplex/code division multiple access user equipment including:
    an antenna configured to receive a plurality of communication bursts transmitted in a time slot;
    a midamble sequence detection device configured to determine a midamble code included in a received communication burst; and
    a channelization code detection device configured to determine a channelization code of a determined midamble's communication burst,
    wherein a mapping between channelization codes and midamble codes exists such that each midamble being mapped to at least one channelization code and at least one midamble code being mapped to at least two channelization codes.

2. The user equipment of claim 1, wherein each midamble code is uniquely associated with a shift of a base midamble code.

3. A method, implemented in a time division duplex/code division multiple access user equipment for determining a channelization code of a communication burst, the method including:
    the user equipment receiving a plurality of communication bursts transmitted in a time slot; and
    the user equipment determining a midamble code included in a received communication burst,
    wherein a mapping exists between channelization codes and midamble codes, each midamble being mapped to at least one channelization code and at least one midamble code being mapped to at least two channelization codes.

4. The method of claim 3, wherein each midamble code is uniquely associated with a shift of a base midamble code.

5. The method of claim 3 wherein the plurality of communication bursts transmitted in a time slot are received simultaneously.

6. The user equipment of claim 1 wherein the plurality of communication bursts transmitted in a time slot are received simultaneously.

* * * * *

UNITED STATES PATENT AND TRADEMARK OFFICE
CERTIFICATE OF CORRECTION

PATENT NO. : 7,710,928 B2  
APPLICATION NO. : 11/098276  
DATED : May 4, 2010  
INVENTOR(S) : Zeira et al.

Page 1 of 1

It is certified that error appears in the above-identified patent and that said Letters Patent is hereby corrected as shown below:

IN THE DRAWINGS

At FIG. 6, item 90, delete "COMPARITOR" and insert --COMPARATOR--.

At FIG. 6, delete "90" and insert --80--.

Signed and Sealed this  
Twenty-fifth Day of October, 2011

David J. Kappos  
*Director of the United States Patent and Trademark Office*